US012021476B2

(12) United States Patent
Poli et al.

(10) Patent No.: US 12,021,476 B2
(45) Date of Patent: Jun. 25, 2024

(54) ADAPTIVE RECTIFICATION FOR PREVENTING CURRENT INVERSION IN MOTOR DRIVING

(71) Applicant: STMicroelectronics S.r.l., Agrate Brianza (IT)

(72) Inventors: Enrico Poli, Osio Sotto (IT); Vincenzo Marano, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 87 days.

(21) Appl. No.: 17/514,832

(22) Filed: Oct. 29, 2021

(65) Prior Publication Data

US 2023/0137346 A1    May 4, 2023

(51) Int. Cl.
*H02P 7/29* (2016.01)

(52) U.S. Cl.
CPC ..................... *H02P 7/29* (2013.01)

(58) Field of Classification Search
CPC ........................................................ H02P 7/29
USPC .................................................... 318/400.17
See application file for complete search history.

(56) References Cited

U.S. PATENT DOCUMENTS

| 2008/0297959 | A1  | 12/2008 | Tanabe et al. |
| 2009/0218972 | A1* | 9/2009  | Yamamoto ................ H02P 6/14 |
|              |     |         | 318/400.09 |
| 2013/0141025 | A1* | 6/2013  | Takamori .................. H02P 6/24 |
|              |     |         | 318/400.21 |
| 2014/0078613 | A1  | 3/2014  | Otaguro |
| 2017/0229986 | A1  | 8/2017  | Allegrini et al. |
| 2019/0386574 | A1  | 12/2019 | Shiomi et al. |
| 2020/0287486 | A1* | 9/2020  | Balakrishnan ............ H02P 6/15 |

FOREIGN PATENT DOCUMENTS

| EP | 1863164 A1 | 12/2007 |
| WO | WO 2012108267 A1 | 8/2012 |
| WO | WO 2020225842 A1 | 11/2020 |
| WO | WO 2021019603 A1 | 2/2021 |
| WO | WO 2021053911 A1 | 3/2021 |
| WO | WO 2021124408 A1 | 6/2021 |

* cited by examiner

*Primary Examiner* — Jorge L Carrasquillo
(74) *Attorney, Agent, or Firm* — Seed IP Law Group LLP

(57) ABSTRACT

A method and apparatus for adaptive rectification for preventing current inversion in motor windings are provided. In the method and apparatus, first and second half bridges of a plurality of half bridges are operated to synchronously rectify and permit passage of current, through the windings of the motor, in a first direction. A change of direction of the current from the first direction to a second direction opposite the first direction is detected. In response to detecting that the current changed direction to the second direction, the first and second half bridges of the plurality of half bridges are operated to quasi-synchronously rectify and block passage of the current through the windings in the second direction.

18 Claims, 10 Drawing Sheets

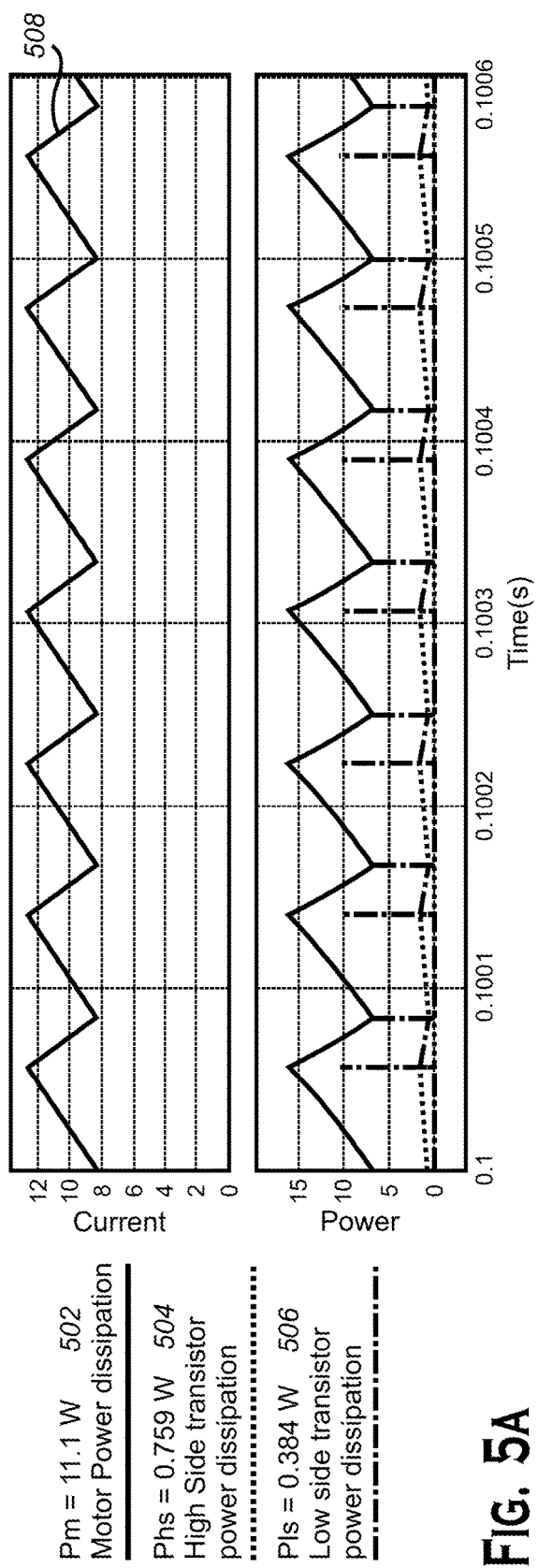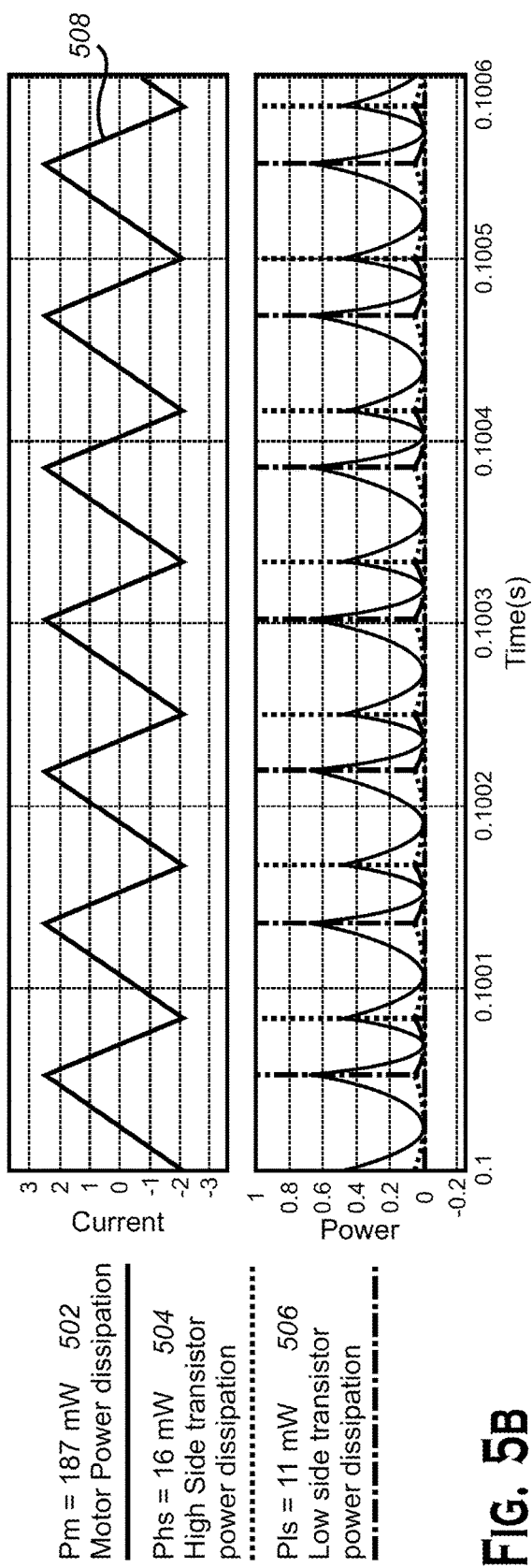

ADAPTIVE RECTIFICATION FOR PREVENTING CURRENT INVERSION IN MOTOR DRIVING

BACKGROUND

Technical Field

This application is directed to adaptive rectification for preventing current inversion in motor winding and, in particular, adaptive rectification that reduces power dissipation in the motor.

Description of the Related Art

Current inversion in motor windings can occur due to a back electromotive force voltage induced on the windings by rotation of the motor. Current is susceptible to inversion when the motor is operated with a small load and the average current passing through the windings is correspondingly small. Further, the current is susceptible to inversion when the motor is operated at high speed and the back electromotive force is correspondingly high. In addition, when a motor has a relatively small inductance, a high current ripple may result in current inversion.

BRIEF SUMMARY

A motor is operated by energizing windings of the motor and sourcing current in a first direction to a first end of the windings and sinking current from a second end of the windings. Energizing the windings occurs during a first time period that corresponds to an on time of a duty cycle of a control signal (pulse width modulated (PWM) signal) used to dictate operation of the motor. During a remainder of the duty cycle (an off time), active energizing of the windings ends. Instead, current of the windings is recirculated in the first direction through the windings.

Current is susceptible to reversal of direction to a second, opposite, direction during the recirculation period. If the current reverses direction, the motor operates less efficiently. Thus, it is advantageous to prevent current from recirculating after the current reverses direction to the second direction. In addition, it is advantageous to allow current to recirculate through a bi-directional conductive path of a transistor (that is in the conductive state) rather than a body diode or a free-wheeling diode of the transistor (that is in the non-conductive state).

During the recirculation period, current is initially permitted to recirculate in the first direction through the conductive path of the transistor, and the direction of current is monitored. If the current reverses direction to the second direction, the transistor is switch off to prevent the current from passing through the transistor in the reverse direction.

BRIEF DESCRIPTION OF THE SEVERAL VIEWS OF THE DRAWINGS

FIGS. 5A and 5B show power dissipation by the motor, power dissipation by the high side transistor and power dissipation by the low side transistor in relation to the current passing through the windings when the half-bridge stage is operated according to synchronous rectification.

DETAILED DESCRIPTION

Figure 1:
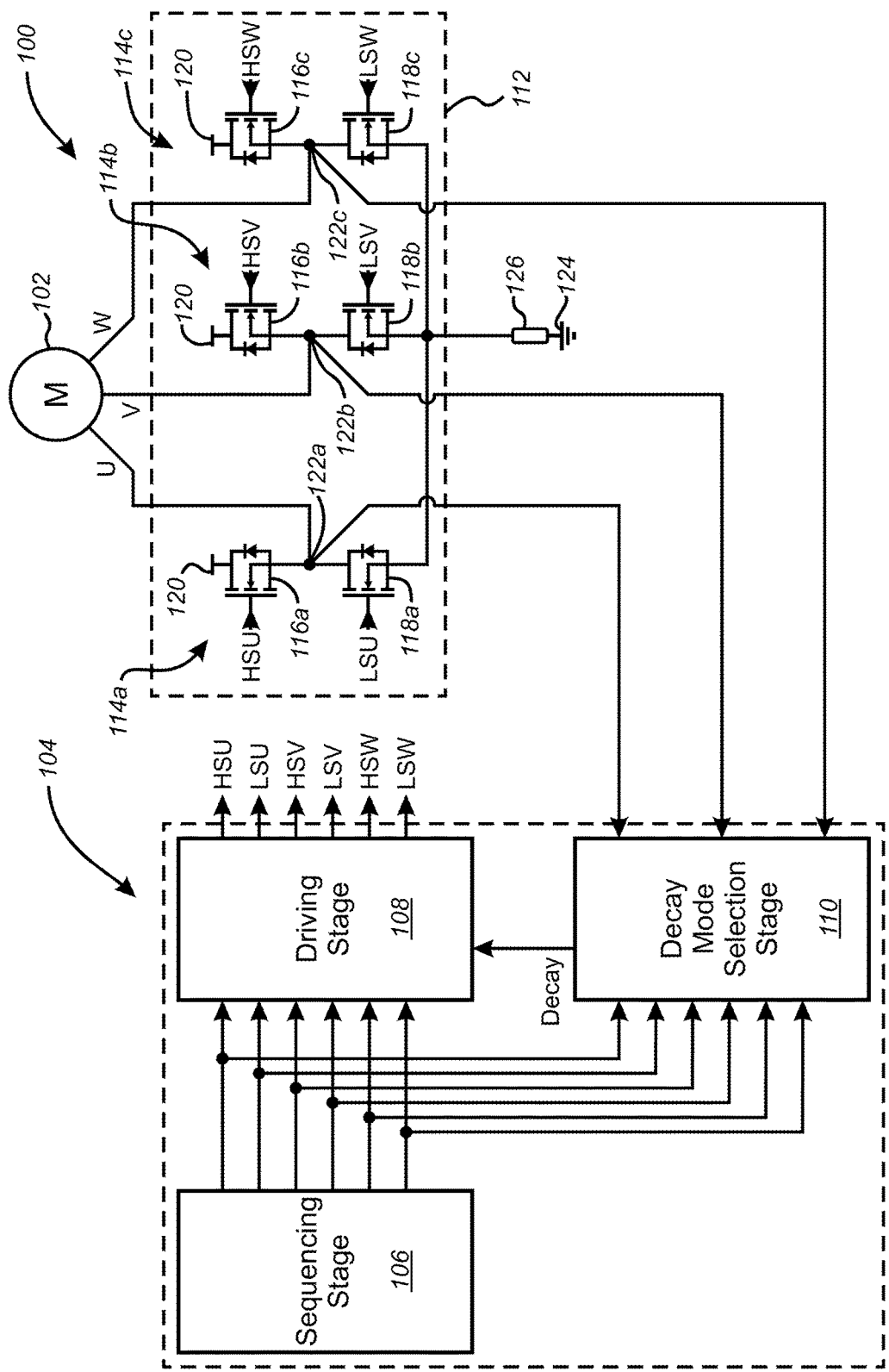
FIG. 1 shows a system including a motor and a control stage.

FIG. 1 shows a system 100 including a motor 102 and a control stage 104. The control stage 104 includes a sequencing stage 106, a driving stage 108, a decay mode selection stage 110 and a half-bridge stage 112. The motor 102 may be a multi-phase (e.g., three-phase) brushless direct current (DC) motor (BLDC). Thus, the motor 102 may include a plurality of phases that are denoted herein as U, V, W.

The half-bridge stage 112 includes a plurality of half-bridges 114a, 114b, 114c respectively corresponding to the plurality of phases of the motor 102. Each half-bridge 114a, 114b, 114c includes a respective high side transistor 116a, 116b, 116c and a respective low side transistor 118a, 118b, 118c. The high side transistors 116a, 116b, 116c each have a first conduction terminal coupled to a voltage supply node 120 and a second conduction terminal coupled to a respective half-bridge node 122a, 122b, 122c. The low side transistors 118a, 118b, 118c each have a first conduction terminal coupled to the respective half-bridge node 122a, 122b, 122c and a second conduction terminal coupled to ground 124. As shown in FIG. 1, a sense resistor 126 may be coupled between the second conduction terminals of the low side transistor 118a, 118b, 118c and ground 124 for generating a current sense voltage representative of current passing therethrough. The high side transistors 116a, 116b, 116c and the low side transistor 118a, 118b, 118c each have a control terminal coupled to the driving stage 108. Furthermore, the transistors 116a, 116b, 116c, 118a, 118b, 118c each have a free-wheeling diode (body diode) in parallel therewith.

The sequencing stage 106 has outputs coupled to inputs of the driving stage 108, respectively, and inputs of the decay mode selection stage 110, respectively. The driving stage 108 has outputs coupled to the control terminals of the high side transistors 116a, 116b, 116c and the low side transistor 118a, 118b, 118c, respectively. The decay mode selection stage has inputs coupled to the half-bridge nodes 122a, 122b, 122c, respectively. The decay mode selection stage 110 has an output coupled to an input of the driving stage 108. The sequencing stage 106, driving stage 108 and decay mode selection stage 110 may be part of one or more controllers of the motor 102.

The sequencing stage 106 generates and outputs one or more enable signals enabling commutation of a half-bridge corresponding to a phase of the motor 102. The sequencing stage 106 also outputs a pulse width modulation (PWM) signal representing the PWM cycle of the commutation. The sequencing stage 106 may also output, to the driving stage 108, a signal indicating a desired direction of current in the motor 102. The driving stage 104 receives the one or more enable signals and the PWM signal and controls the high side transistors 116a, 116b, 116c and the low side transistor 118a, 118b, 118c based on the one or more enable signals and the PWM signal. Controlling the high side transistors 116a, 116b, 116c and the low side transistor 118a, 118b, 118c includes sending driving signals (HSU, HSV, HSW, LSU, LSV, LSW) to the respective control terminals of the high side transistors 116a, 116b, 116c and the low side transistor 118a, 118b, 118c to put the transistors in conductive or non-conductive state.

If the one or more enable signals enable the first half-bridge 114a (phase U), the driving stage 104 controls the first half-bridge 114a to commutate according to the PWM signal conditional upon the current passing through the phase. The driving stage 104 puts the low side transistor 118b of the second half-bridge 114b (phase V) in the conductive state (or alternatively puts the high side transistor 116b of the second half-bridge 114b in the conductive state if the high side transistors 116a, 116b, 116c are used for current recirculation). If the current reverses direction, the driving stage 104 controls the first half-bridge 114a and the second half-bridge 114b as described herein according to the adaptive rectification. The driving stage 104 puts the third half-bridge 114c (phase W) in a high impedance state with both the high and low side transistors 116c, 118c turned off. The driving stage 104 similarly alternates between different pairs of half-bridges for current passage depending on the half-bridge indicated as enabled by the one or more enable signals.

The decay mode selection stage 110 receives a plurality of signals. A signal of the plurality of signals is representative of a voltage of a respective half-bridge node 122a, 122b, 122c. The decay mode selection stage 110 compares the voltages of two half-bridge nodes 122a, 122b, 122c used for current circulation. A result of the comparison is representative of a direction of current in a phase of the motor 102. Based on the comparison, the decay mode selection stage 110 outputs a control signal to the driving state 108. The control signal indicates to the driving state 108 the direction of current flow in the phase or whether to operate the half-bridge stage 112 in synchronous (first mode) or quasi-synchronous (second mode) rectification. As described herein, the driving state 108 operates the transistors 116a, 116b, 116c, 118a, 118b, 118c based on the control signal. The driving state 108 operates the transistors to block current recirculation when the current reverses direction.

A plurality of windings of the motor 102 may be positioned on a stator (not shown) of the motor 102. The motor 102 may be a synchronous motor, and a rotation speed of the motor may be synchronized with a frequency of current in the windings. Rotation is obtained in response to the magnetic field generated by the current passing through the plurality of windings.

The plurality of windings each have respective first and second ends. The plurality of windings may be coupled in a star configuration in the motor, whereby the respective first ends of the plurality of windings are coupled to each other. The second ends of the plurality of windings are respectively coupled to the half-bridge nodes 122a, 122b, 122c. Displacement between the magnetic field generated by the current passing through the plurality of windings and a magnetic field generated by the rotor's permanent magnets exerts a torque that produces the motor rotation.

Figure 2:
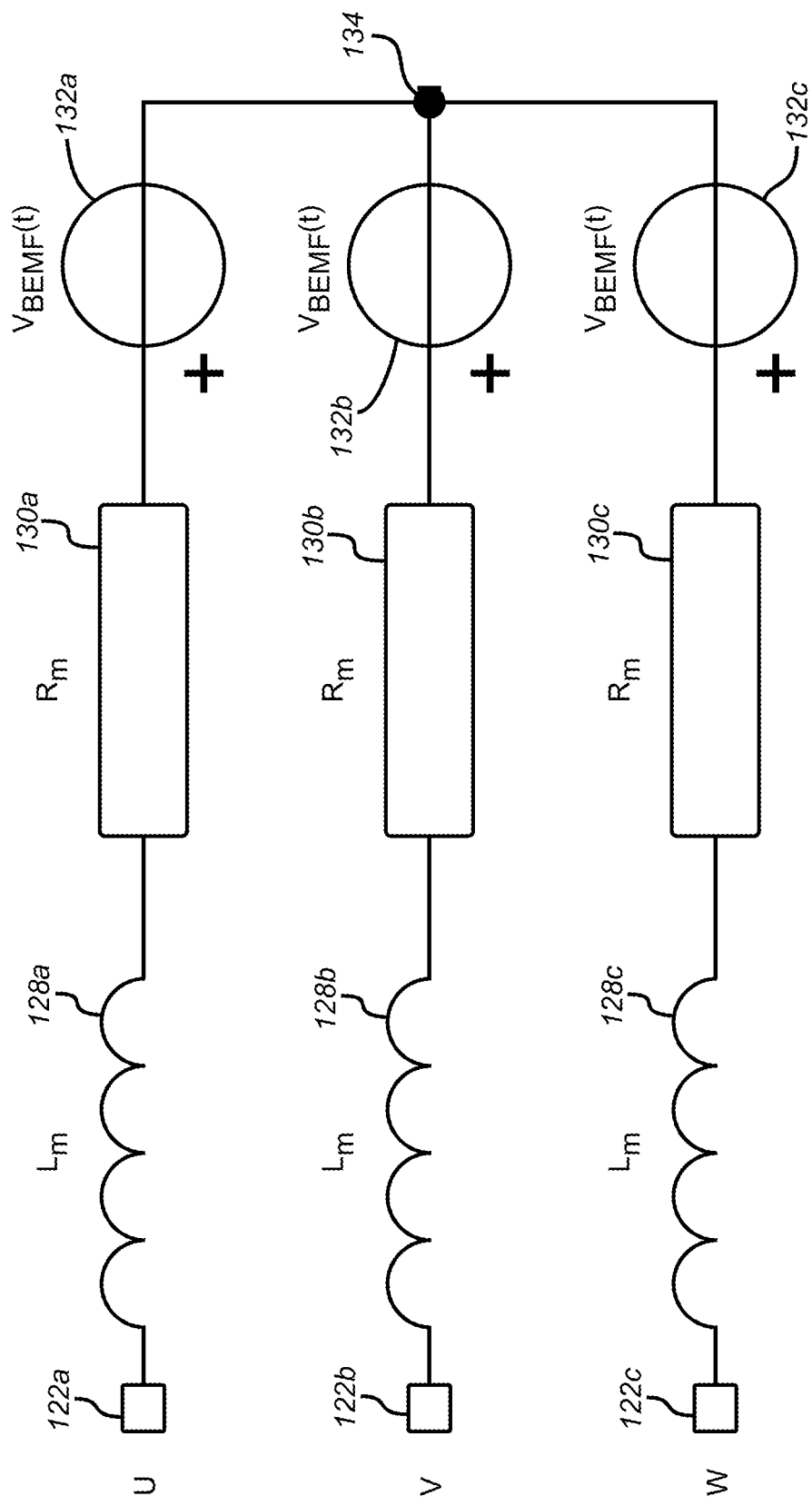
FIG. 2 shows an electrical modeling of the phases of the motor.

FIG. 2 shows an electrical modeling of the phases of the motor 102. The winding of each phase U, V, W of the motor 102 may be represented as an inductance 128a, 128b, 128c (denoted 'Lm'), a resistance 130a, 130b, 130c (denoted 'Rm') and a voltage source 132a, 132b, 132c (denoted '$V_{BEMF}(t)$') that are serially coupled. As described herein, a first end of a winding is coupled to a star configuration node 134 and a second end of the winding serves as a motor lead and is coupled to a respective half-bridge node 122a, 122b, 122c. The voltage source 132a, 132b, 132c represents a back electromotive force voltage induced on the windings by motor rotation. A level of the back electromotive force voltage is proportional to a rotation speed of the rotor. When an angular displacement between rotor and stator magnetic fields is around 90°, the back electromotive force voltage opposes the current passing through the winding.

Torque is positively correlated with an average of the current passing through the windings ($I_{phase,avg}$). In addition, torque depends on the angular displacement between the rotor and stator magnetic fields. Generally, torque is maximized when the angular displacement is 90°. Torque reaches a minimum when the magnetic fields are aligned and the angular displacement is 0°. The torque may be represented as:

$$Tq \propto I_{phase,avg} \times f(\theta).\qquad\text{Equation (1)}$$

where $f(\theta)$ is a function relating rotor and stator magnetic field displacement to torque.

The control stage 104 may drive the motor 102 according to a six-step sequence technique in which one pair of windings is energized at a time according to a sequence of six possible current directions, each of which corresponding to a stator magnetic field vector. The control stage 104 may commutate current to different pairs of windings based on a sensor reading or sensorless techniques, such as back electromotive force zero-crossing detection. Commutating the current allows for keeping the angular displacement between the two magnetic fields in a desired optimal range. The control stage 104 may select a subsequent pair to energize based on a desired motor direction.

The driving stage 108 may operate the transistors 116a, 116b, 116c, 118a, 118b, 118c between conductive and non-conductive states stage based on the one or more PWM signals according to the six-step sequence technique. Further, the driving stage 108 may adjust the average current ($I_{phase,avg}$), directly or indirectly, to regulate the torque.

Figure 3A:
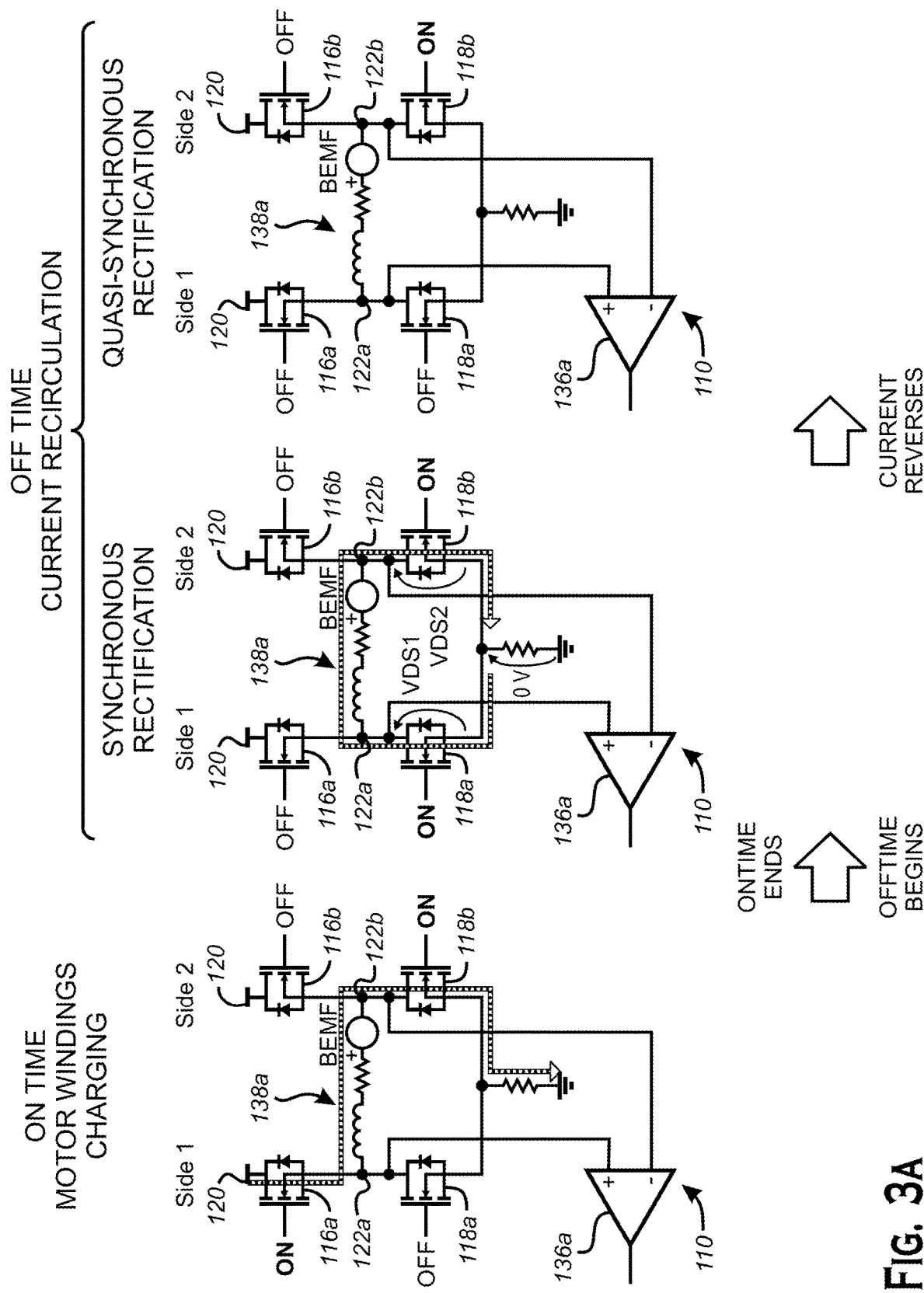
FIG. 3A shows an example of control of a half-bridge stage.

FIG. 3A shows an example of control of the half-bridge stage 112. First and second half-bridges 114a, 114b corresponding respective sides (a first side (side 1) and a second side (side 2)) are shown in FIG. 3A. It is noted that although the first and second half-bridges 114a, 114b corresponding to phases U and V, respectively, are shown in FIG. 3A, the control described herein may be used for any other pair of half-bridges, phases or sides used to operate the motor 102.

The decay mode selection stage 110 includes a first comparator 136a. The first comparator 136a has a first input (for example, a non-inverting input) coupled to the first half-bridge node 122a and a second input (for example, an inverting input) coupled to the second half-bridge node 122b. The first comparator 136a also has an output. A pair of windings 138a corresponding to the windings of the U and V phases is coupled between the half-bridge nodes 122a, 122b. The pair of windings 138a are modeled as an inductance, resistance and voltage source that are serially coupled. The inductance, resistance and voltage source of the pair of windings 138a are aggregates of the inductances 128a, 128b, resistances 130a, 130b and voltage sources 132a, 132b, respectively.

While the first and second half-bridges 114a, 114b are operated during a PWM cycle, the third half-bridge 114c is in a high impedance state. During the high impedance state, the third high side transistor 116c and the third low side transistor 118c of the third half-bridge 114c are non-conductive (switched off).

During an on time of the PWM cycle, the driving stage 108 puts the first high side transistor 116a in a conductive state and the first low side transistor 118a in a non-conductive state. In addition, the driving stage 108 puts the second high side transistor 116b in a non-conductive state and the second low side transistor 118a in a conductive state. During the on time, the driving stage 108 charges the pair of windings 138a by applying a supply voltage of the voltage supply node 120 to the windings 138a. Current flows through the windings 138a from the first half-bridge node 122a to the second half-bridge node 122b. The first half bridge 114a sources current and the second half bridge 114b sinks current.

When the on time of the PWM cycle ends and the off time of the PWM cycle begins, the driving stage 108 switches operation from current charging to current recirculation using synchronous rectification. At the start of the off time, the driving stage 108 transitions the first high side transistor 116a to the non-conductive state and the first low side transistor 118a to the conductive state. The driving stage 108 maintains the second half-bridge 114b in the same state as the on time. Thus, the driving stage 108 shorts the second ends of the windings 138a. The shorting allows the windings 138a to discharge.

During each of the commutations described above, the driving stage 108 may introduce an intermediate period, generally named dead-time, where both the high side transistor 116a and the low side transistor 118a of the first half-bridge 114a are in the non-conductive state.

The current passing through the windings 138a may reverse direction. Direction reversal may occur due to fact that the current is not constant in magnitude. The current is susceptible to ripples resulting from characteristics of the motor, the supply voltage and the back electromotive force. In particular, when the motor 102 is operated at a relatively low torque and using a corresponding low average current ($I_{phase,avg}$), current inversion is more likely to occur. For example, a low average current may be below one ampere (A).

If the current reverses direction, the driving stage 108 does not use synchronous rectification to operate the half-bridge stage 112 during the entirety of the off time. The driving stage 108 ends synchronous rectification (first mode of rectification) and operates the half-bridge stage 112 using quasi-synchronous rectification (second mode of rectification) in response to current direction reversal.

During synchronous rectification, the decay mode selection stage 110 compares the voltages at the ends of the windings 138a to identify a direction of the current passing through the windings 138a. As shown in FIG. 3A, the first comparator 136a of the decay mode selection stage 110 receives a first voltage of the first half-bridge node 122a and a second voltage of the first half-bridge node 122b. The first voltage may be representative of a voltage drop (VDS1) across the first low side transistor 118a, and the second voltage may be representative of a voltage drop (VDS2) across the second low side transistor 118b. The first voltage may be a product of the current passing through the windings 138a and a total resistance between the conductive terminals of the first low side transistor 118a when the first low side transistor 118a is conductive (also referred to as a drain-source on resistance ($R_{DS(on)}$). The second voltage may be a product of the current passing through the windings 138a and a drain-source on resistance ($R_{DS(on)}$) of the second low side transistor 118a.

The second conduction terminals of the low side transistors 118a, 118b are coupled to each other. Thus, if the first voltage is less than the second voltage, then the current has not reversed direction. The current flows from the second low side transistor 118b to the first low side transistor 118a through their common coupling and from the first low side transistor 118a to the second low side transistor 118b through the windings 138a. If the current has not reversed direction, the decay mode selection stage 110 keeps operating the half-bridge stage 112 using synchronous rectification. The decay mode selection stage 110 continues comparing the first and second voltages during the off time.

Conversely, if the first voltage is greater than the second voltage, then the current has reversed direction. The current flows from the first low side transistor 118a to the second low side transistor 118b through their common coupling and from the second low side transistor 118b to the first low side transistor 118a through the windings 138a. If the first and second voltages are the same, then current does not flow through the windings 138a (or the current level is 0A).

If the current reverses direction, the decay mode selection stage 110 responds by dynamically causing operation to transition to quasi-synchronous rectification. The decay mode selection stage 110 outputs the control signal commanding the driving stage 108 to switch off the first low side transistor 118a. The first low side transistor 118a becomes non-conductive and prevents the current from flowing in the reverse direction.

Figure 3B:
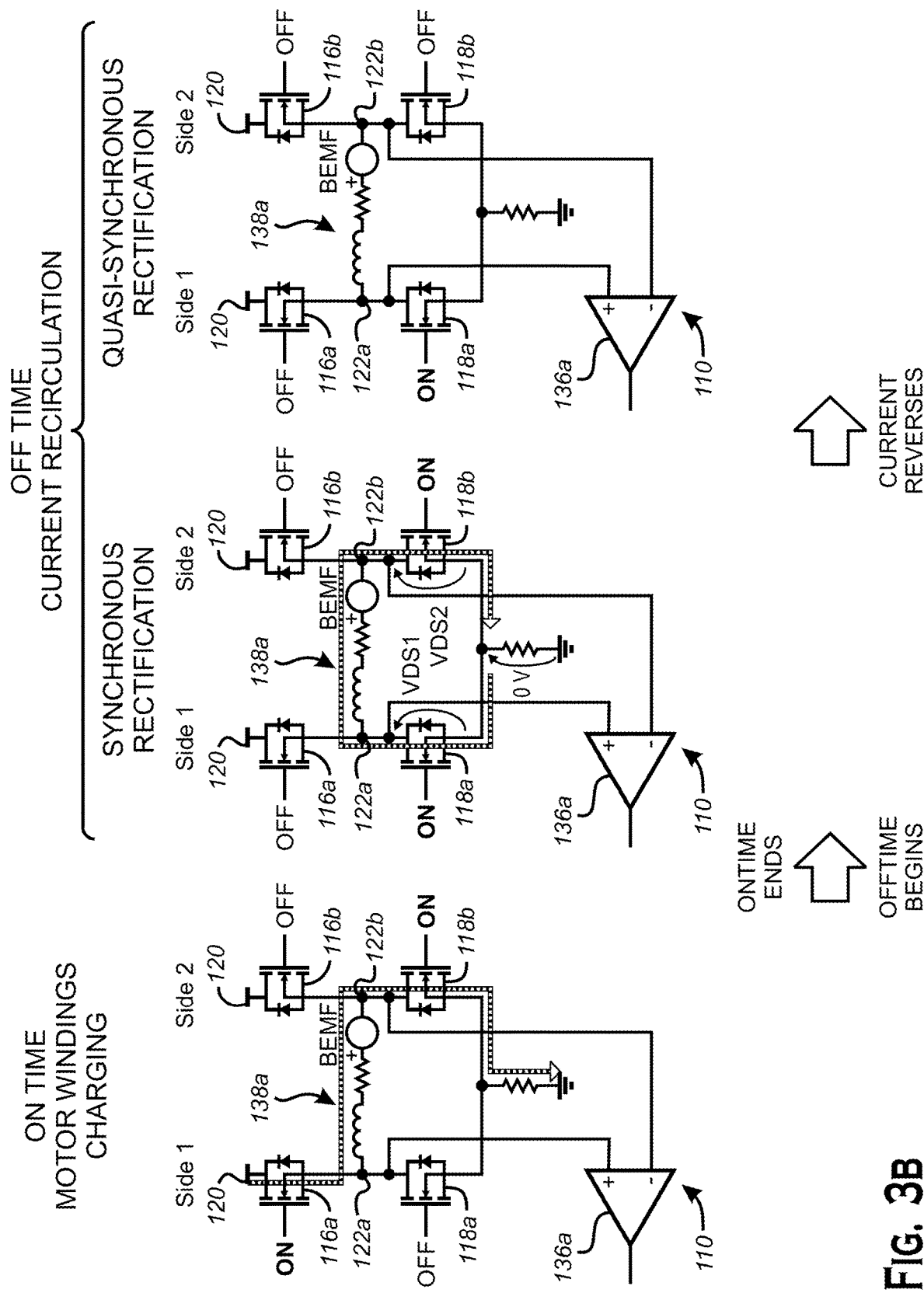
FIG. 3B shows an example of control of a half-bridge stage.

Alternatively, the driving stage 108 switches off the second low side transistor 118b. The second low side transistor 118b becomes non-conductive and prevents the current from flowing in the reverse direction as shown in the example of control shown in FIG. 3B.

The decay mode selection stage 110 may compare the first and second voltages and output the control signal during an off time of a PWM cycle of the PWM signal. The decay mode selection stage 110 may refrain from comparing the first and second voltages and outputting the control signal during an on time of the PWM cycle. Further, the decay mode selection stage 110 may cause operation to transition from quasi-synchronous rectification to synchronous rectification in response to detecting that direction reversal has ceased during the off time of the PWM cycle.

Operating the half-bridge stage 112 using adaptive rectification as described herein is advantageous over operating the half-bridge stage 112 exclusively using synchronous rectification or exclusively using quasi-synchronous rectification during the off time. Operating the half-bridge stage 112 using adaptive rectification results in less power dissipation as compared to operating exclusively using quasi-synchronous rectification.

Further, operating the half-bridge stage 112 prevents current inversion observed in synchronous rectification.

Power dissipation by the windings 138a is positively correlated with the root mean square (RMS) of the current passing through the windings ($I_{phase,RMS}$). The power dissipation is represented as:

$$P_d \propto I_{phase,RMS} \quad \text{Equation (2)}$$

Current inversion reduces the average of the current passing through the windings ($I_{phase,avg}$) resulting in lower torque. However, current inversion positively contributes to the RMS of the current and results in increasing power dissipation. Preventing current inversion reduces the mismatch between the average and the RMS of the current and improves the efficiency of the motor 102.

Furthermore, the power dissipated in response to the passage of current through the free-wheeling diode of the first low side transistor 118a (when the first low side transistor 118a is conductive) is higher than the power dissipated as a result of the current passage through the conductive path of the first low side transistor 118a (when the first low side transistor 118a is non-conductive).

In exclusive synchronous rectification, the first low side transistor 118a is conductive during the off time. Recirculation current passes through the first low side transistor 118a. Thus, less power is dissipated as a result of the passage of the recirculated current in the first low side transistor 118a than the alternative use of the free-wheeling diode to allow current passage. However, when the current reverses direction, the first low side transistor 118a is in a conductive state, and passage of the current in the reverse direction is permitted.

Alternatively, in exclusive quasi-synchronous rectification, the first low side transistor 118a is non-conductive during the off time. The current recirculates through the free-wheeling diode of the first low side transistor 118a. The free-wheeling diode advantageously blocks the flow of current if the current is inverted and reverses direction. However, the free-wheeling diode dissipates more power than the first low side transistor 118a in the conductive state. Thus, less power is dissipated as a result of the passage of the recirculated current through the first low side transistor 118a than the alternative use of the free-wheeling diode. However, when the current reverses direction during synchronous rectification, the first low side transistor 118a is in a conductive state, and passage of the current in the reverse direction is permitted.

Figure 4A:
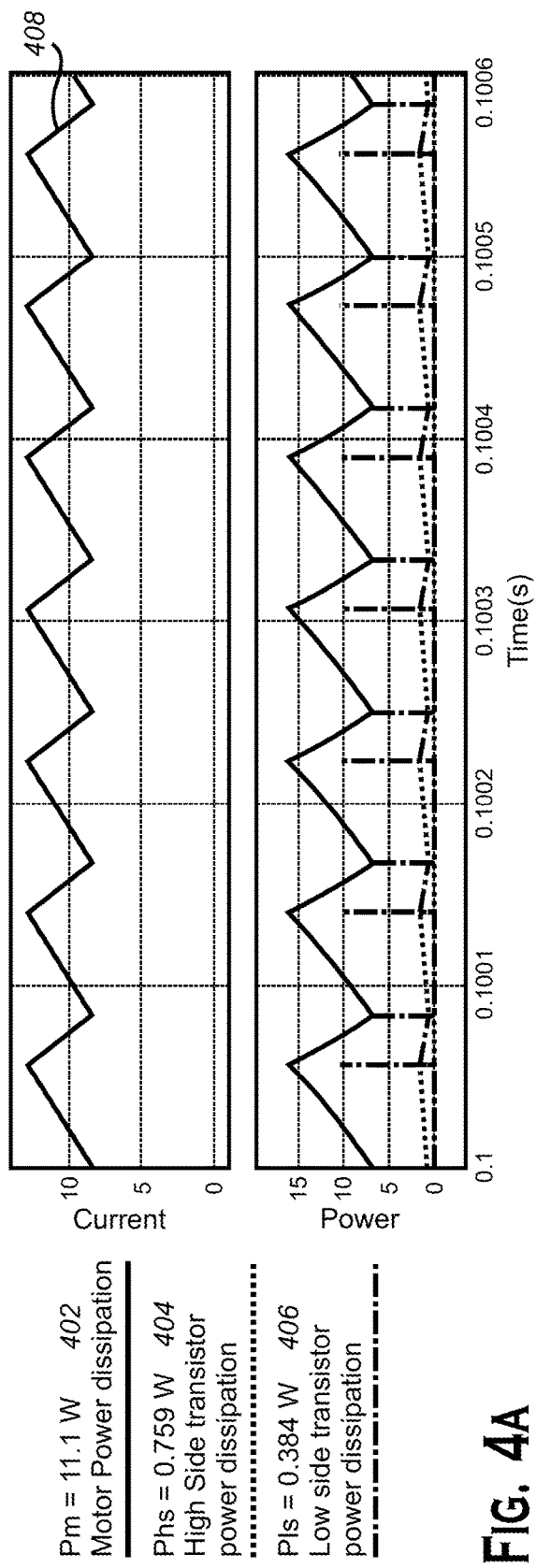
FIGS. 4A and 4B show power dissipation by the motor, power dissipation by a high side transistor and power dissipation by a low side transistor in relation to current passing through windings when the half-bridge stage is operated according to the adaptive rectification technique.

FIG. 4A shows power dissipation 402 by the motor 102, power dissipation 404 by the high side transistor 116a and power dissipation 406 by the low side transistor 118a in relation to the current 408 passing through the windings 138a when the half-bridge stage 112 is operated according to the adaptive rectification technique described herein. The inductance (Lm) 128a is 100 microhenry (μH), the resistance (Rm) 130a is 0.1 Ohm (Ω), the voltage source ($V_{BEMF}$(t)) 132a is 15 volts (V) and the supply voltage is 24V. To facilitate a higher torque, the current 408 passing through the windings 138a is relatively high. The current 408 passing through the windings 138a is maintained at above 7.5 A.

Due to the elevated current 408, the risk of current inversion is low. The power 402 dissipated by the motor 102 varies in relation to the current 408 passing through the windings 138a. Further, the high side transistor 116a dissipates power 404 during the on time of the PWM cycle when the high side transistor 116a is conductive and ceases dissipating power 404 during the off time of the PWM cycle when the high side transistor 116a is non-conductive. Conversely, the low side transistor 118a dissipates power 406 during the off time of the PWM cycle when the low side transistor 118a is conductive and ceases dissipating power 406 during the on time of the PWM cycle when the low side transistor 118a is non-conductive.

Due to the absence of current inversion in FIG. 4A, the mean and RMS of the current 408 passing through the windings 138a are commensurate with each other. The low side transistor 118a does not dissipate power in an excessive manner.

Figure 4B:
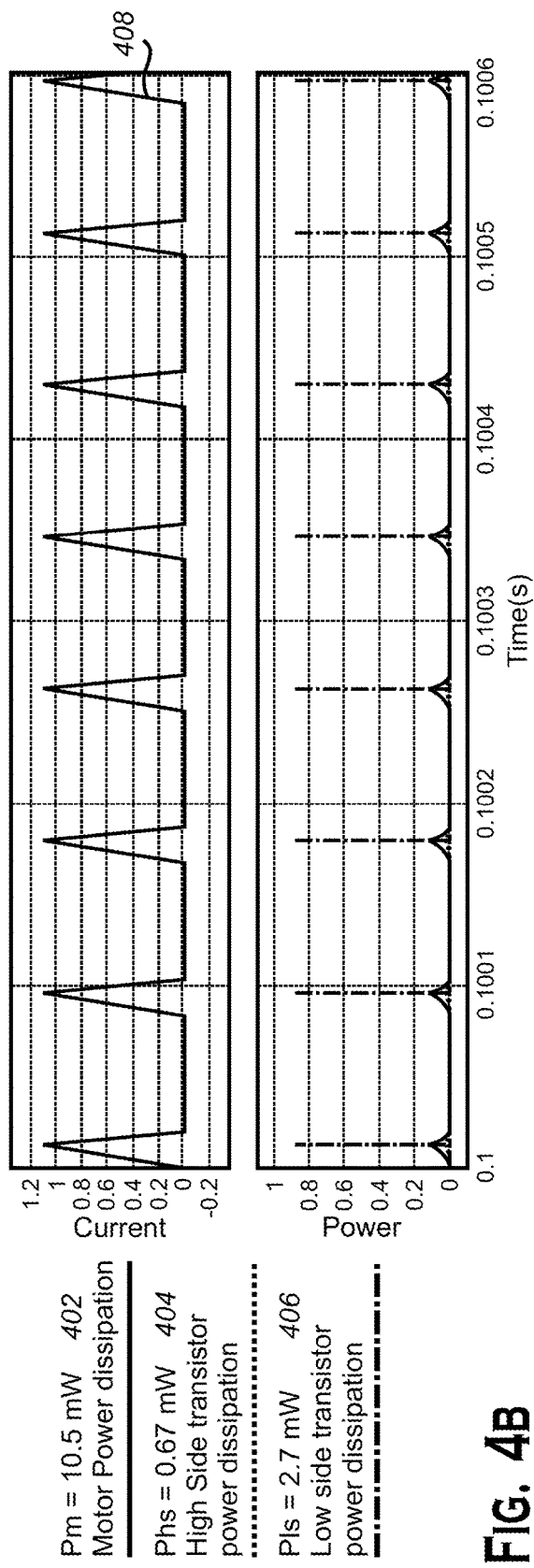

FIG. 4B shows the power dissipation 402 by the motor 102, the power dissipation 404 by the high side transistor 116a and the power dissipation 406 by the low side transistor 118a in relation to the current 408 passing through the windings 138a when the half-bridge stage 112 is operated according to the adaptive rectification technique described herein. The inductance (Lm) 128a, resistance (Rm) 130a, voltage source ($V_{BEMF}$(t)) 132a and supply voltage is 24V have the same values described with reference to FIG. 4A. The current 408 passing through the windings 138a is lower than the current 408 of FIG. 4A (for example, due to the motor being operated at lower torque).

As shown in FIG. 4B, the current 408 is prevent from being inverted. The motor 102 dissipates power 402 when the current 408 is passing through the windings 138a. Further, the low side transistor 118a exhibits a peak in power dissipation 406 when the low side transistor 118a is switched from on to off. The power dissipation 402, 404, 406 of the motor 102, high side transistor 116a and low side transistor 118a, respectively, are negligible when the current is OA (and is blocked from flowing through the windings 138a due to direction reversal).

During the operation of FIGS. 4A and 4B using the adaptive rectification technique described herein, the power dissipation 402 by the motor 102 is the predominant contributor to the total dissipated power. The power dissipation 404 by the high side transistor 116a and the power dissipation 406 by the low side transistor 118a are comparatively small in relation to the power dissipation 402 by the motor 102.

FIG. 5A shows power dissipation 502 by the motor 102, power dissipation 504 by the high side transistor 116a and power dissipation 506 by the low side transistor 118a in relation to the current 508 passing through the windings 138a when the half-bridge stage 112 is operated according to synchronous rectification. The values of the inductance (Lm) 128a, resistance (Rm) 130a, voltage source ($V_{BEMF}$(t)) 132a and the supply voltage are the same as described with reference to FIG. 4A. The current 508 passing through the windings 138a remains positive and is not blocked as a result of inversion. Accordingly, the power dissipation performance of synchronous rectification is the same as the power dissipation performance of the adaptive rectification technique shown in FIG. 4A. The power dissipation 502 by the motor 102, the power dissipation 504 by the high side transistor 116a and the power dissipation 506 by the low side transistor 118a are the same as the power dissipation 402 by the motor 102, the power dissipation 404 by the high side transistor 116a and the power dissipation 406 by the low side transistor 118a, respectively, described with reference to FIG. 4A.

FIG. 5B shows the power dissipation 502 by the motor 102, the power dissipation 504 by the high side transistor 116a and the power dissipation 506 by the low side transistor 118a in relation to the current 508 passing through the windings 138a when the half-bridge stage 112 is operated according to synchronous rectification. The inductance (Lm) 128a, resistance (Rm) 130a, voltage source ($V_{BEMF}$(t)) 132a and supply voltage is 24V have the same values described with reference to FIG. 4A. As shown in FIG. 5B, the current 508 has a lower value average value than the current 508 shown in FIG. 5A, and, thus, the current 508 is more susceptible to direction reversal.

As shown in 5B, the current 508 reverses direction during operation of the motor 102. The motor 102 dissipates power 502 when the current 508 is passing through the windings 138a irrespective of the direction of the current 508 resulting in increased power dissipation compared to operation using the adaptive rectification technique described herein. Further, the high side transistor 116a and the low side transistor 118a also dissipate more power.

Figure 6A:
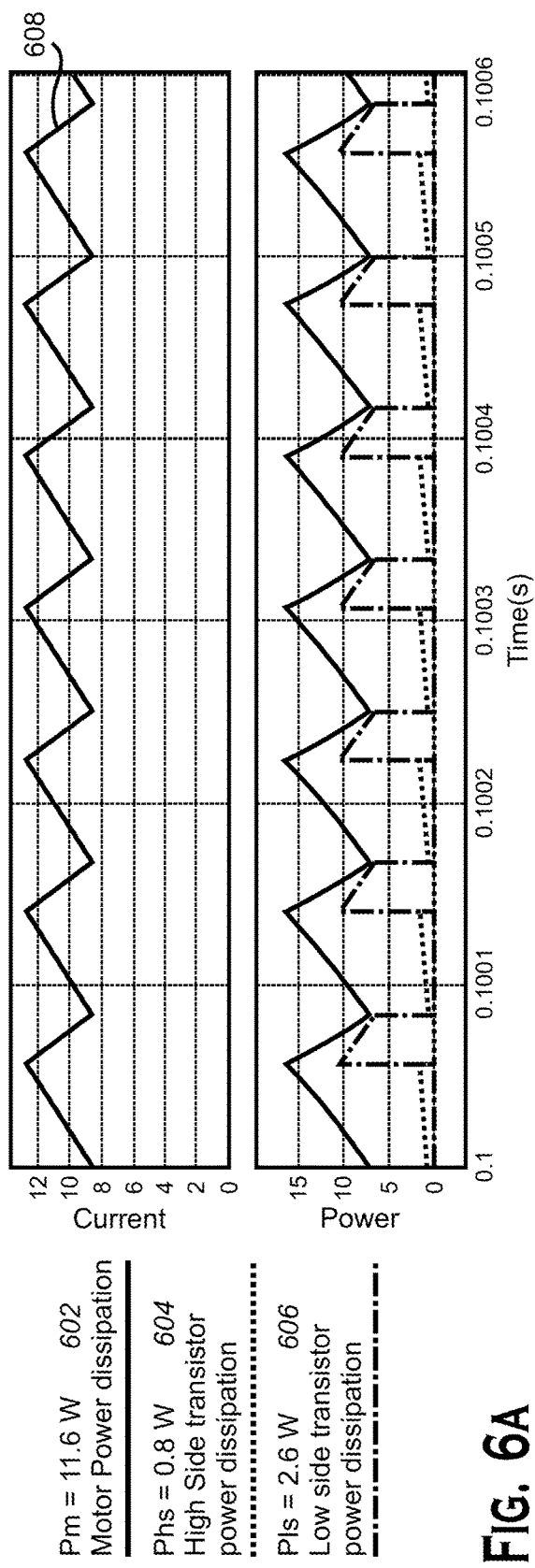
FIGS. 6A and 6B shows power dissipation by the motor, power dissipation by the high side transistor and power dissipation by the low side transistor in relation to the current passing through the windings when the half-bridge stage is operated according to quasi-synchronous rectification.

FIG. 6A shows power dissipation 602 by the motor 102, power dissipation 604 by the high side transistor 116a and power dissipation 606 by the low side transistor 118a in relation to the current 608 passing through the windings 138a when the half-bridge stage 112 is operated according to quasi-synchronous rectification. The values of the inductance (Lm) 128a, resistance (Rm) 130a, voltage source ($V_{BEMF}(t)$) 132a and the supply voltage are the same as described with reference to FIG. 4A. The current 608 passing through the windings 138a remains positive and is not blocked as a result of inversion. Accordingly, the power dissipation of the motor 102 and the high side transistor 116a are comparable to the power dissipation performance of the adaptive rectification technique shown in FIG. 4A.

However, the low side transistor 118a dissipates more power during the off time of the PWM duty cycle due to the fact that the low side transistor 118a is turned off and the current 608 passes through the body diode of the low side transistor 118a. The body diode of the low side transistor 118a dissipates more power than the conductive path of the low side transistor 118a.

Figure 6B:
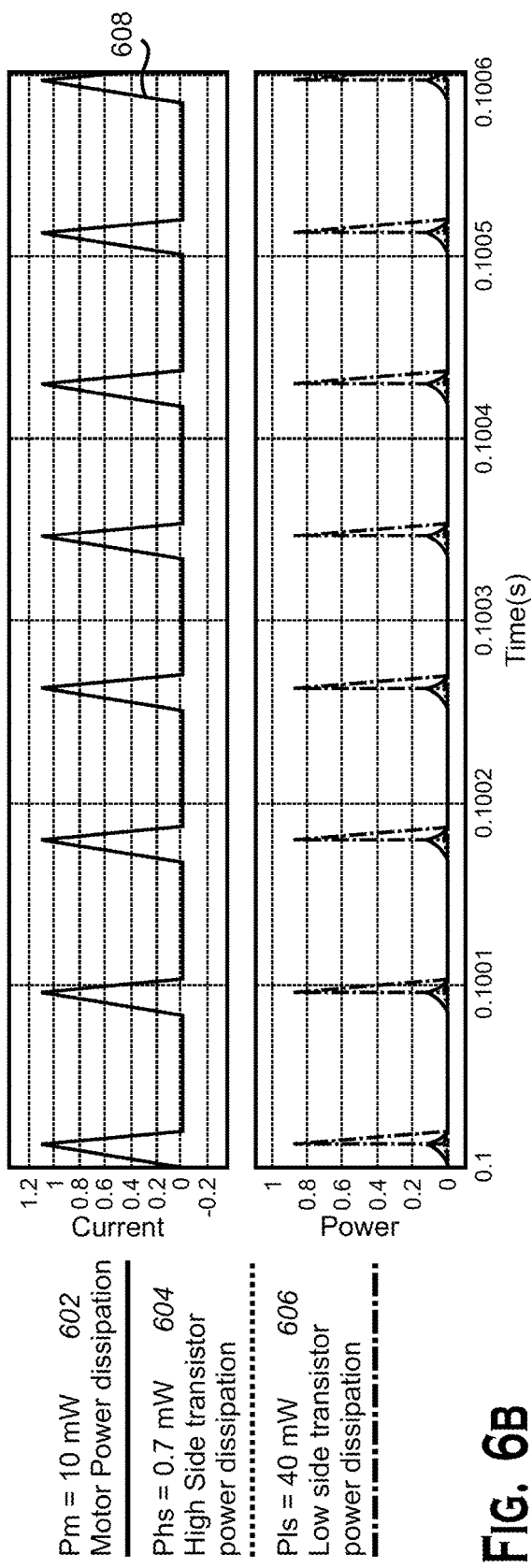

FIG. 6B shows the power dissipation 602 by the motor 102, the power dissipation 604 by the high side transistor 116a and the power dissipation 606 by the low side transistor 118a in relation to the current 608 passing through the windings 138a when the half-bridge stage 112 is operated according to quasi-synchronous rectification. The inductance (Lm) 128a, resistance (Rm) 130a, voltage source ($V_{BEMF}(t)$) 132a and supply voltage is 24V have the same values described with reference to FIG. 4A.

Similar to the current 608 in FIG. 6A, during the off time of the PWM cycle, the low side transistor 118a dissipates more power than in the adaptive rectification technique of FIG. 4B due to the fact that the low side transistor 118a is turned off and the current 608 passes through the body diode of the low side transistor 118a. As compared to FIG. 5B, the quasi-synchronous rectification blocks the current reversal.

The adaptive rectification technique described herein avoids current inversion. The adaptive rectification technique maximizes a ratio between the average and the RMS of the current passing through the windings of a motor to minimize power dissipation. The current is recirculated into switches rather than free-wheeling diodes thereof to reduce power dissipation.

In an embodiment, the driving stage 108 or the decay mode selection stage 110 may use filtering and/or blanking to suppress or disable transitions between quasi-synchronous rectification and synchronous rectification that occur within a defined period of time. The use of filtering and/or blanking is advantageous in that it prevents frequent switching between modes of operation.

In an embodiment, the driving stage 108 may transition from synchronous to quasi-synchronous operation at most once during an off time of a PWM cycle. Thus, when the control signal indicates that operation is to be switched from synchronous to quasi-synchronous operation during an off time, the driving stage 108 switches to quasi-synchronous operation and keeps operating the half-bridge stage 112 quasi-synchronously until the end of the off time.

It is noted that lower power dissipation allows for increasing the density of the control stage 104 (for example, on a printed circuit board (PCB). Further, lower power dissipation allows for using fewer heat sinks, using fewer ventilation devices, forgoing the use of heat sinks and forgoing the use of ventilation devices to cool the control stage 104. In addition, reducing the power dissipation reduces manufacturing costs as it permits usage of transistors with larger drain-source on resistance ($R_{DS(on)}$) in the half-bridge stage 112 that are more economical than counterparts with a lower drain-source on resistance ($R_{DS(on)}$).

Although embodiments are described herein in which the current passing through the windings of the motor 102 recirculates through the low side transistors 118a, 118b, 118c, a different convention may be adopted. For example, the current may be recirculated through the high side transistors 116a, 116b, 116c.

Figure 7:
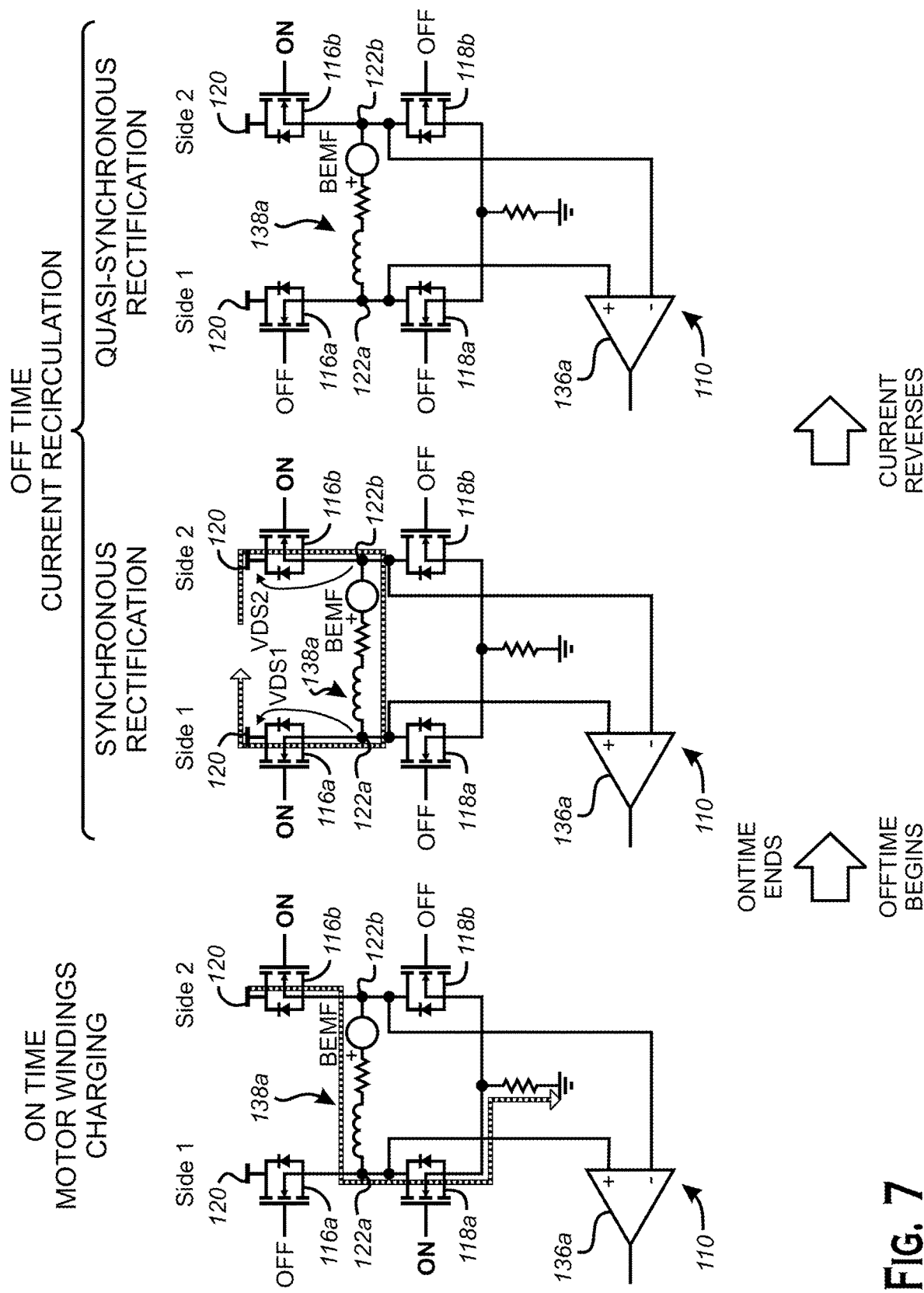
FIG. 7 shows an example of control of the half-bridge stage when current is recirculated through the high side transistors.

FIG. 7 shows an example of control of the half-bridge stage 112 when current is recirculated through the high side transistors 116a, 116b, 116c. Similar elements of FIG. 7 as those described with reference to FIG. 3A have the same reference numerals. In FIG. 7, the first and second low side transistors 118a, 118b are non-conductive and the first and second high side transistors 116a, 116b are commonly coupled at the voltage supply node 120 (having the supply voltage). The first voltage may represent a difference between the supply voltage and a voltage drop (VDS1) across the first high side transistor 116a, and the second voltage may be representative of a difference between the supply voltage and a voltage drop (VDS2) across the second high side transistor 116b.

When the first voltage is lower than the second voltage, the current flows from the first high side transistor 116a into the windings 138a and from the windings 138a to the second high side transistor 116b. Conversely, when the first voltage is higher than the second voltage, the current flows from the second high side transistor 116b into the windings 138a and from the windings 138a to the first high side transistor 116a. If the desired current direction is counterclockwise in the half-bridge stage 112 of FIG. 7, then the current reverses direction when the first voltage is higher than the second voltage. Thus, during off time operation, the decay mode selection stage 110 switches operation from synchronous rectification to quasi-synchronous rectification in response detecting that the first voltage has become higher than the second voltage. It is noted, various operations described herein in relation to current recirculation through the low side transistors 118a, 118b, 118c may be changed to accommodate current recirculation through the high side transistors 116a, 116b, 116c.

Figure 8A:
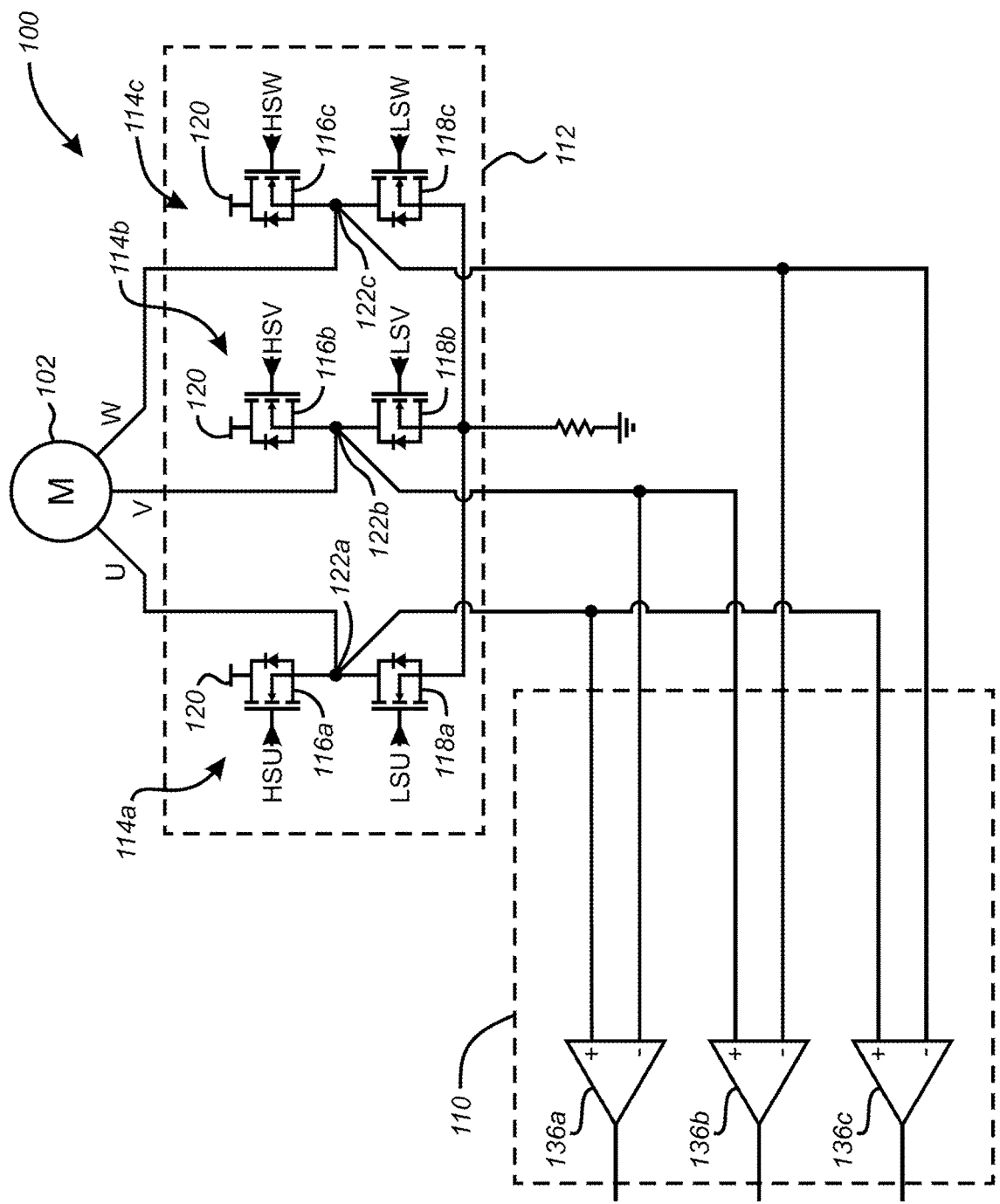
FIG. 8A shows the decay mode selection stage according to an embodiment.

FIG. 8A shows a decay mode selection stage 110 according to an embodiment. The decay mode selection stage 110 is shown coupled to the half-bridge stage 112. In addition to the first comparator 136a, the decay mode selection stage 110 includes second and third comparators 136b, 136c. The second comparator 136b has a first input (for example, a non-inverting input) coupled to the second half-bridge node 122b and a second input (for example, an inverting input) coupled to the third half-bridge node 122c. The second comparator 136b also has an output. The third comparator 136c has a first input (for example, a non-inverting input) coupled to the first half-bridge node 122a and a second input (for example, an inverting input) coupled to the third half-bridge node 122c. The third comparator 136c also has an output.

As described in relation to the first comparator 136*a* herein, the second comparator 136*b* identifies current reversal when the second and third phases are energized (for example, per the six-step sequence technique). The third comparator 136*c* identifies current reversal when the first and third phases are energized. The comparison results output by the comparators 136*a*, 136*b*, 136*c* are used by the decay mode selection stage 110 to output the control signal to the driving stage 108.

In place of utilizing multiple comparators respectively corresponding to different energized phase pairs, the decay mode selection stage 110 may include switches that selectively couple comparator inputs to different phases.

Figure 8B:
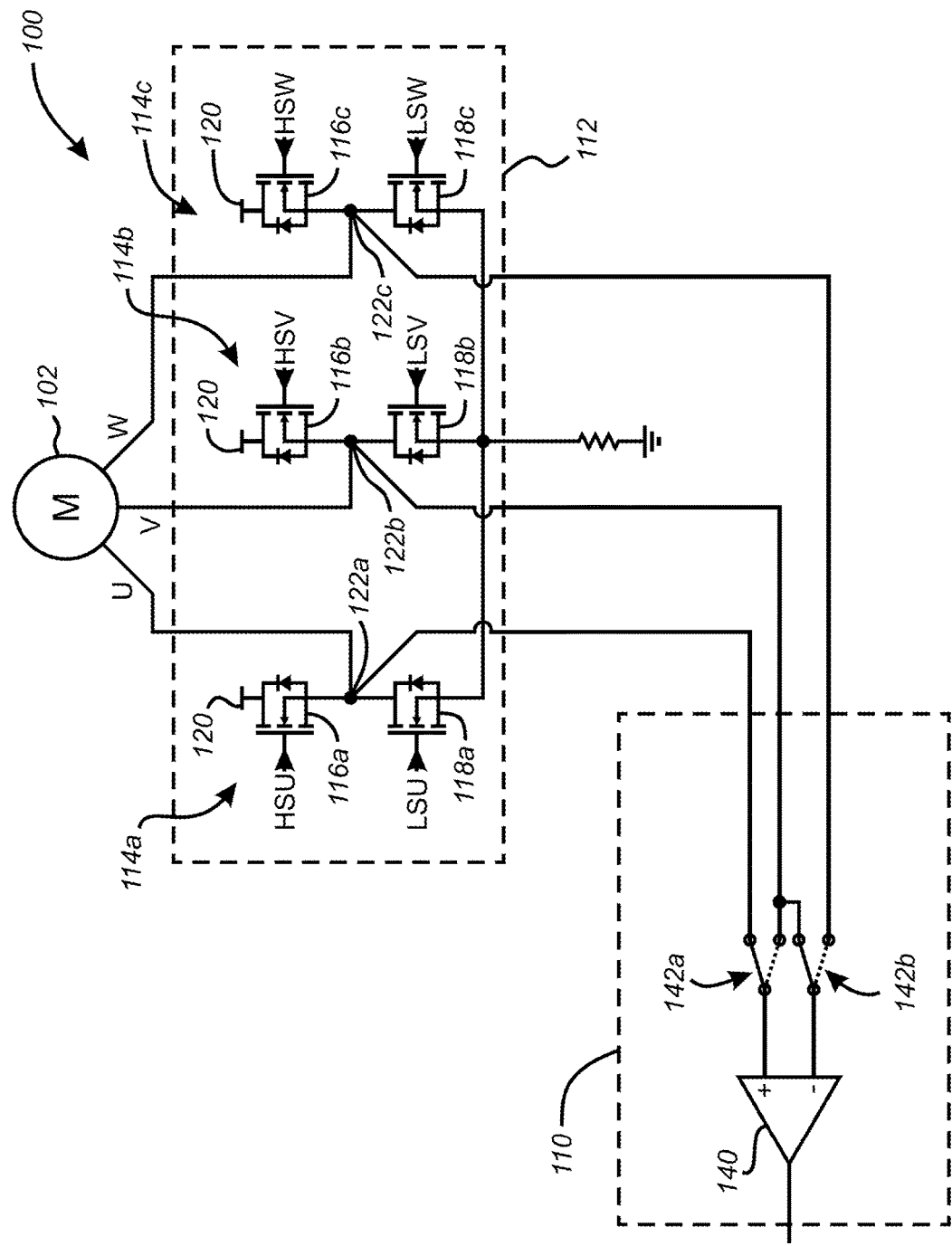
FIG. 8B shows the decay mode selection stage according to an embodiment.

FIG. 8B shows a decay mode selection stage 110 according to an embodiment. The decay mode selection stage 110 includes a comparator 140 and first and second switches 142*a*, 142*b*. The comparator 140 has first and second inputs and an output. The first switch 142*a* has a first terminal coupled to the first input of the comparator 140, and the second switch 142*b* has a first terminal coupled to the second input of the comparator 140. The first switch 142*a* has second and third terminals respectively coupled to the first and second half-bridge nodes 122*a*, 122*b*. The second switch 142*b* has second and third terminals respectively coupled to the second and third half-bridge nodes 122*b*, 122*c*.

The first and second switches 142*a*, 142*b* operate to respectively couple the first and second inputs of the comparator 140 to two different half-bridge nodes 122*a*, 122*b*, 122*c* used to recirculate current through the windings 138*a*. The comparison result output by the comparator 140 are used by the decay mode selection stage 110 to output the control signal to the driving stage 108.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a motor including a plurality of phases; and
a control stage including:
a half-bridge stage including a plurality of half bridges respectively coupled to the plurality of phases; and
a driving stage configured to:
during an on time of a pulse width modulation (PWM) cycle of a PWM control phase, charging windings corresponding to first and second phases of the plurality of phases to cause current to flow through the windings in a first direction;
during an off time of the PWM cycle of the PWM control phase, operate first and second half bridges of the plurality of half bridges to synchronously rectify and permit passage of current through the windings in the first direction;
receive, during synchronous rectification in the off time of the PWM cycle, a first control signal indicating that the current changed direction during the synchronous rectification to a second direction opposite the first direction; and
in response to receiving the first control signal, cause the synchronous rectification to end and operate, for a remainder of the off time of the PWM cycle, the first and second half bridges of the plurality of half bridges to quasi-synchronously rectify and block passage of the current through the windings in the second direction.

2. The device of claim 1, wherein the driving stage is configured to:
receive a second control signal indicating the PWM cycle having the on time and the off time; and
operate the first and second half bridges to synchronously rectify and quasi-synchronously rectify during the off time of the PWM cycle.

3. The device of claim 2, wherein the driving stage is configured to:
operate the first half bridge to source current to the windings and the second half bridge to sink current from the windings during the on time of the PWM cycle.

4. The device of claim 1, wherein:
the first half bridge includes a first half bridge node, a first high side transistor coupled to the first half bridge node and a first low side transistor coupled to the first half bridge node, and
the second half bridge includes a second half bridge node, a second high side transistor coupled to the second half bridge node and a second low side transistor coupled to the second half bridge node.

5. The device of claim 4, wherein:
the control stage includes a comparator having a first input coupled to the first half bridge node, a second input coupled to the second half bridge node and an output, and
the control stage is configured to:
compare a first voltage of the first half bridge node and a second voltage of the second half bridge node; and
generate the first control signal based on comparing the first voltage and the second voltage.

6. The device of claim 4, wherein the driving stage is configured to:
operate the first and second half bridges of the plurality of half bridges to synchronously rectify by:
controlling the first high side transistor and the second high side transistor to be conductive and controlling the first low side transistor and the second low side transistor to be non-conductive, or
controlling the first low side transistor and the second low side transistor to be conductive and controlling the first high side transistor and the second high side transistor to be non-conductive.

7. The device of claim 4, wherein the driving stage is configured to:
operate the first and second half bridges of the plurality of half bridges to quasi-synchronously rectify by controlling one transistor of the first high side transistor, the second high side transistor, the first low side transistor, and the second low side transistor to be conductive and controlling remaining transistors of the first high side transistor, the second high side transistor, the first low side transistor, and the second low side transistor to be non-conductive.

8. A controller of a motor, comprising:
a plurality of outputs operative to be coupled to a plurality of transistor control terminals, respectively; and
a plurality of inputs operative to be respectively coupled to a plurality of half bridge nodes of a plurality of half bridges, wherein the controller is configured to:

during an on time of a pulse width modulation (PWM) cycle of a PWM control phase, charging windings corresponding to first and second phases of a plurality of phases to cause current to flow through the windings in a first direction;

during an off time of the PWM cycle of the PWM control phase, operate first and second half bridges of the plurality of half bridges to synchronously rectify and permit passage of current through the windings in the first direction;

detect, during synchronous rectification in the off time of the PWM cycle, that the current changed direction during the synchronous rectification to a second direction opposite the first direction; and in response to detecting that the current changed direction to the second direction, cause the synchronous rectification to end and operate, for a remainder of the off time of the PWM cycle, the first and second half bridges of the plurality of half bridges to quasi-synchronously rectify and block passage of the current through the windings in the second direction.

9. The controller of claim 8, wherein the controller is configured to:

generate a control signal indicating the PWM cycle having the on time and the off time; and operate the first and second half bridges to synchronously rectify and quasi-synchronously rectify during the off time of the PWM cycle.

10. The controller of claim 9, wherein the controller is configured to:

operate the first half bridge to source current to the windings and the second half bridge to sink current from the windings during the on time of the PWM cycle.

11. The controller of claim 8, wherein:

the first half bridge includes a first high side transistor coupled to a first half bridge node of the plurality of half bridge nodes and a first low side transistor coupled to the first half bridge node of the plurality of half bridge nodes, and the second half bridge includes a second high side transistor coupled to a second half bridge node of the plurality of half bridge nodes and a second low side transistor coupled to the second half bridge node of the plurality of half bridge nodes.

12. The controller of claim 11, wherein the controller is configured to:

compare a first voltage of the first half bridge node and a second voltage of the second half bridge node; and detect that the current changed direction to the second direction based on comparing the first voltage and the second voltage.

13. The controller of claim 11, wherein the controller is configured to:

operate the first and second half bridges of the plurality of half bridges to synchronously rectify by:

controlling the first high side transistor and the second high side transistor to be conductive and controlling the first low side transistor and the second low side transistor to be non-conductive, or controlling the first low side transistor and the second low side transistor to be conductive and controlling the first high side transistor and the second high side transistor to be non-conductive.

14. The controller of claim 11, wherein the controller is configured to:

operate the first and second half bridges of the plurality of half bridges to quasi-synchronously rectify by controlling one transistor of the first high side transistor, the second high side transistor, the first low side transistor, and the second low side transistor to be conductive and controlling remaining transistors of the first high side transistor, the second high side transistor, the first low side transistor, and the second low side transistor to be non-conductive.

15. A method, comprising:

during an on time of a pulse width modulation (PWM) cycle of a PWM control phase, charging windings corresponding to first and second phases of a plurality of phases to cause current to flow through the windings of a motor in a first direction, a plurality of half bridges being respectively coupled to the plurality of phases;

during an off time of the PWM cycle of the PWM control phase, operating first and second half bridges of the plurality of half bridges to rectify in a first mode and permit passage of current through the windings in a first direction;

detecting, during synchronous rectification in the off time of the PWM cycle, that the current changed direction during the synchronous rectification to a second direction opposite the first direction; and in response to detecting that the current changed direction to the second direction, causing the synchronous rectification to end and operating, for a remainder of the off time of the PWM cycle, the first and second half bridges of the plurality of half bridges to rectify in a second mode and block passage of the current through the windings in the second direction.

16. The method of claim 15, comprising:

generating a control signal indicating the PWM cycle having the on time and the off time;

operating the first and second half bridges to rectify in the first and second modes during the off time of the PWM cycle; and operating the first half bridge to source current to the windings and the second half bridge to sink current from the windings during the on time of the PWM cycle.

17. The method of claim 15, comprising:

comparing a first voltage of a first half bridge node of the first half bridge and a second voltage of a second half bridge node of the second half bridge; and detecting that the current changed direction to the second direction based on comparing the first voltage and the second voltage.

18. The method of claim 15, comprising:

after operating the first and second half bridges of the plurality of half bridges to rectify in the second mode, detecting that the current changed direction to the first direction from the second direction; and in response to detecting that the current changed direction to the first direction from the second direction, operating the first and second half bridges of the plurality of half bridges to rectify in the first mode.

* * * * *